Oct. 20, 1936.   R. L. HALLOCK   2,058,226
ICE TRAY FOR REFRIGERATORS
Original Filed May 28, 1932
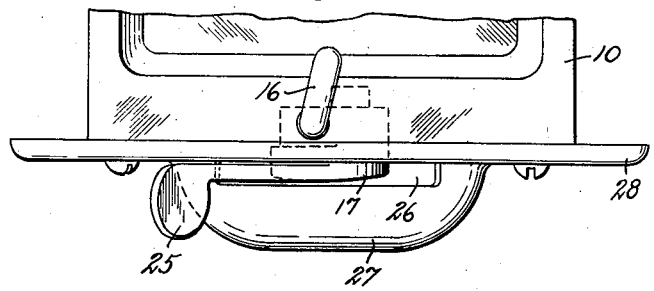
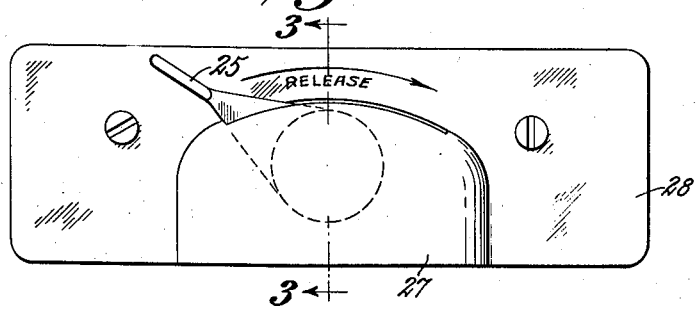
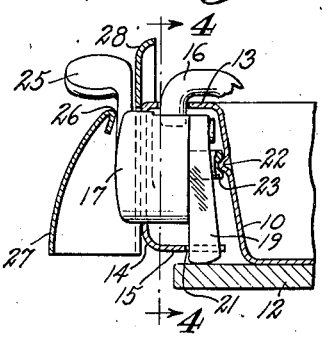
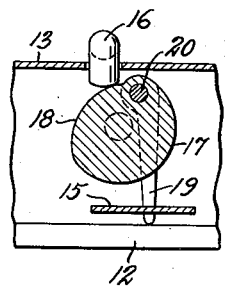
INVENTOR,
Robert Lay Hallock
BY
ATTORNEY.

Patented Oct. 20, 1936

2,058,226

UNITED STATES PATENT OFFICE 2,058,226

ICE TRAY FOR REFRIGERATORS

Robert Lay Hallock, Larchmont, N. Y.

Original application May 28, 1932, Serial No. 614,091. Divided and this application June 7, 1935, Serial No. 25,364

6 Claims. (Cl. 62—108.5)

This application is a division of my copending application filed May 28, 1932, Serial No. 614,091 a part of which has matured March 31, 1936 as Patent No. 2,036,043.

My invention relates to ice tray release mechanism and release mechanism for grids of ice trays. The nature of the invention will be apparent from the following description taken in conjunction with the accompanying drawing forming a part of this specification, and of which:

Fig. 1 is a plan view of a device embodying the invention;

Fig. 2 is a front view;

Fig. 3 is a sectional view taken on the line 3—3 of Fig. 2; and

Fig. 4 is a sectional view taken on the line 4—4 of Fig. 3.

The ice tray to which the invention is applied includes a tray body 10. The tray body 10 rests on a shelf 12 of an evaporator. The forward part of the tray body is formed with a horizontal part 13, a downwardly extending flange or depending part 14, and a rearwardly extending part 15. The upper horizontal part 13 is formed with an aperture to receive a neck 16 which is attached to a grid contained in the tray body in any suitable manner and which projects downwardly through part 13. The forward part 14 is formed with a circular aperture of large diameter to receive a circular head 17. Head 17 is formed with a cam surface at 18 as shown in Fig. 4. Neck 16 bears against the cam surface 18 so that when the member 17 is rotated clockwise as shown in Fig. 2 the neck 16 is pushed upwardly for release of the grid. A downwardly projecting member 19 is pivoted at 20 on the member 17 and extends through a slot 21 in the lower part 15 of the tray body extension. Member 19 is adapted to contact the shelf 12 and, on turning the member 17, the member 19 projects downwardly below the tray body to cause release thereof from the shelf. A bump 22 is formed in the tray body which constitutes a bearing member for a projection 23 on member 17. At the forward part of member 17 is a handle member 25 which projects through a slot 26 formed in the upper part of a handle portion 27 of a front cover plate 28. The handle part 27 is of the drawer type in which the fingers are projected upwardly. The slot forms a guide for the handle member 25 and the member 17 is prevented from having longitudinal movement due to the cooperation of the handle or lever part 25 with the slot 26.

If the handle part 25 is turned clockwise as shown in Fig. 2, it will turn the member 17 and cause the member 19 to project downwardly to release the tray and the part 16 will ride on the cam surface 18 so as to release the grid.

What I claim is:

1. Ice making apparatus including a tray body, a front plate attached to said body having a horizontally extending slot therein, and a leverage member extending through said slot.

2. Ice making apparatus including a tray body, a front plate attached to said tray body having a handle portion and formed with a slot at the top of the handle portion, and a lever extending through said slot.

3. Ice making apparatus including a tray body, a front plate attached to said tray body having a horizontally extending slot therein, and leverage mechanism mounted on said tray body and including a handle extending through said slot and a part adapted to be extended from a retracted position to such position that a portion of it extends below the tray body.

4. Ice making apparatus including a tray body, a front plate attached to said body having a slot therein, and lever mechanism including a handle part extending through said slot, said slot constituting positioning means for said lever mechanism.

5. Ice making apparatus including a tray body having a forward extension, leverage mechanism journalled in said forward extension and on said tray body, and guide means for said leverage mechanism including a handle part.

6. An ice tray for a refrigerator including a tray body having a forward extension, a rotatable member journalled in said extension and on the tray body, a depending member pivoted on said rotatable member, and a front plate attached to said tray body, said rotatable member being held in position longitudinally of the tray body by said front plate.

ROBERT LAY HALLOCK.